(12) United States Patent
Xu et al.

(10) Patent No.: US 12,704,386 B2
(45) Date of Patent: Aug. 11, 2026

(54) METHOD, APPARATUS, AND SYSTEM OF PROVIDING ZONE-TO-ZONE TRIP RELIABILITY ANALYSIS USING PROBE DATA

(71) Applicant: HERE Global B.V., Eindhoven (NL)

(72) Inventors: Jingwei Xu, Buffalo Grove, IL (US); Weimin Huang, Chicago, IL (US); Yuxin Guan, Chicago, IL (US); Bruce Bernhardt, Wauconda, IL (US)

(73) Assignee: Here Global B.V., Eindhoven (NL)

( * ) Notice: Subject to any disclaimer, the term of this patent is extended or adjusted under 35 U.S.C. 154(b) by 110 days.

(21) Appl. No.: 18/392,893

(22) Filed: Dec. 21, 2023

(65) Prior Publication Data

US 2025/0207941 A1 Jun. 26, 2025

(51) Int. Cl.
*G01C 21/34* (2006.01)
*G01C 21/00* (2006.01)

(52) U.S. Cl.
CPC ..... *G01C 21/3841* (2020.08); *G01C 21/3476* (2013.01)

(58) Field of Classification Search
USPC .......................................................... 701/533
See application file for complete search history.

(56) References Cited

U.S. PATENT DOCUMENTS 7,522,069 B2 4/2009 Tunnell et al.
2016/0202074 A1* 7/2016 Woodard ............. G06Q 10/047 701/465
2020/0400086 A1* 12/2020 Pati ....................... F02D 41/021
2023/0082960 A1* 3/2023 Lewis ............. G08G 1/096775 701/439

OTHER PUBLICATIONS

"Does Travel Time Reliability Matter?—Primer", U.S. Department of Transportation Federal Highway Administration, retrieved on Dec. 21, 2023 from https://ops.fhwa.dot.gov/publications/fhwahop19062/whatis.htm, 10 pages.

(Continued)

*Primary Examiner* — Adam D Tissot
(74) *Attorney, Agent, or Firm* — DITTHAVONG, STEINER & MLOTKOWSKI

(57) ABSTRACT

An approach is provided for zone-to-zone trip reliability. The approach involves, for example, determining probe data collected from a plurality of sensors of a plurality of probe vehicles traveling in a geographic area of interest. The approach also involves processing the probe data to determine a plurality of vehicle trips. The approach further involves clustering the plurality of vehicle trips into one or more zone-to-zone trip categories based on the origin zones and destination zones of the plurality of vehicle trips. The approach further involves, for each zone-to-zone trip category of the one or more zone-to-zone trip categories, computing a zone-to-zone trip category reliability metric based on the plurality of vehicle trips clustered into each zone-to-zone trip category. The approach further involves providing the zone-to-zone trip category reliability metric for each zone-to-zone trip category as an output.

20 Claims, 11 Drawing Sheets

(56) References Cited

OTHER PUBLICATIONS

Bimpou et al., "Dynamic Accessibility: Incorporating Day-To-Day Travel Time Reliability into Accessibility Measurement", Journal of Transport Geography, vol. 89, Dec. 2020, 20 pages.

Lu, "Estimate freeway travel time reliability under recurring and nonrecurring congestion", Graduate Theses and Dissertations. 16170, 2017, 147 pages.

Chen et al., abstract of "Understanding network travel time reliability with on-demand ride service data", Research Article, Front. Eng. 2017, vol. 4, Issue (4),4 pages.

Tiwari et al., "Route Prediction Using Trip Observations and Map Matching", 2013 3rd IEEE International Advance Computing Conference (IACC), pp. 583-587.

* cited by examiner

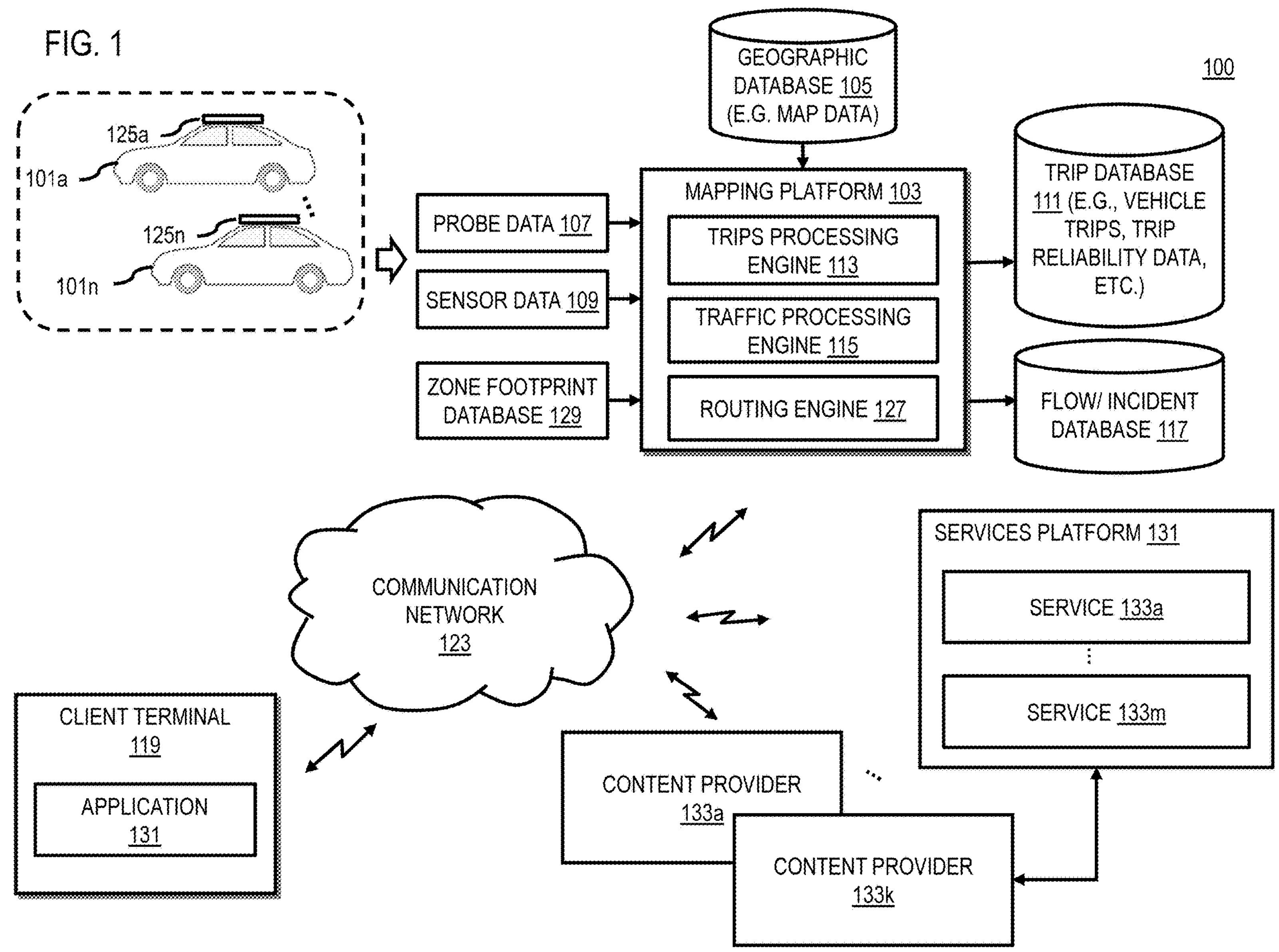
FIG. 1
125a
101a
125n
101n
PROBE DATA 107
SENSOR DATA 109
ZONE FOOTPRINT DATABASE 129
GEOGRAPHIC DATABASE 105 (E.G. MAP DATA)
MAPPING PLATFORM 103
TRIPS PROCESSING ENGINE 113
TRAFFIC PROCESSING ENGINE 115
ROUTING ENGINE 127
100
TRIP DATABASE 111 (E.G., VEHICLE TRIPS, TRIP RELIABILITY DATA, ETC.)
FLOW/ INCIDENT DATABASE 117
COMMUNICATION NETWORK 123
CLIENT TERMINAL 119
APPLICATION 131
SERVICES PLATFORM 131
SERVICE 133a
SERVICE 133m
CONTENT PROVIDER 133a
CONTENT PROVIDER 133k 203
205
125a
125b
101a
101b
OBSERVABLE REPORTS 201
GEOGRAPHIC DATABASE 105
MAPPING PLATFORM 101
MAPPING DATA PIPELINE 207
SERVICES PLATFORM 131 (E.G., OEM PLATFORM)

Figure 4:
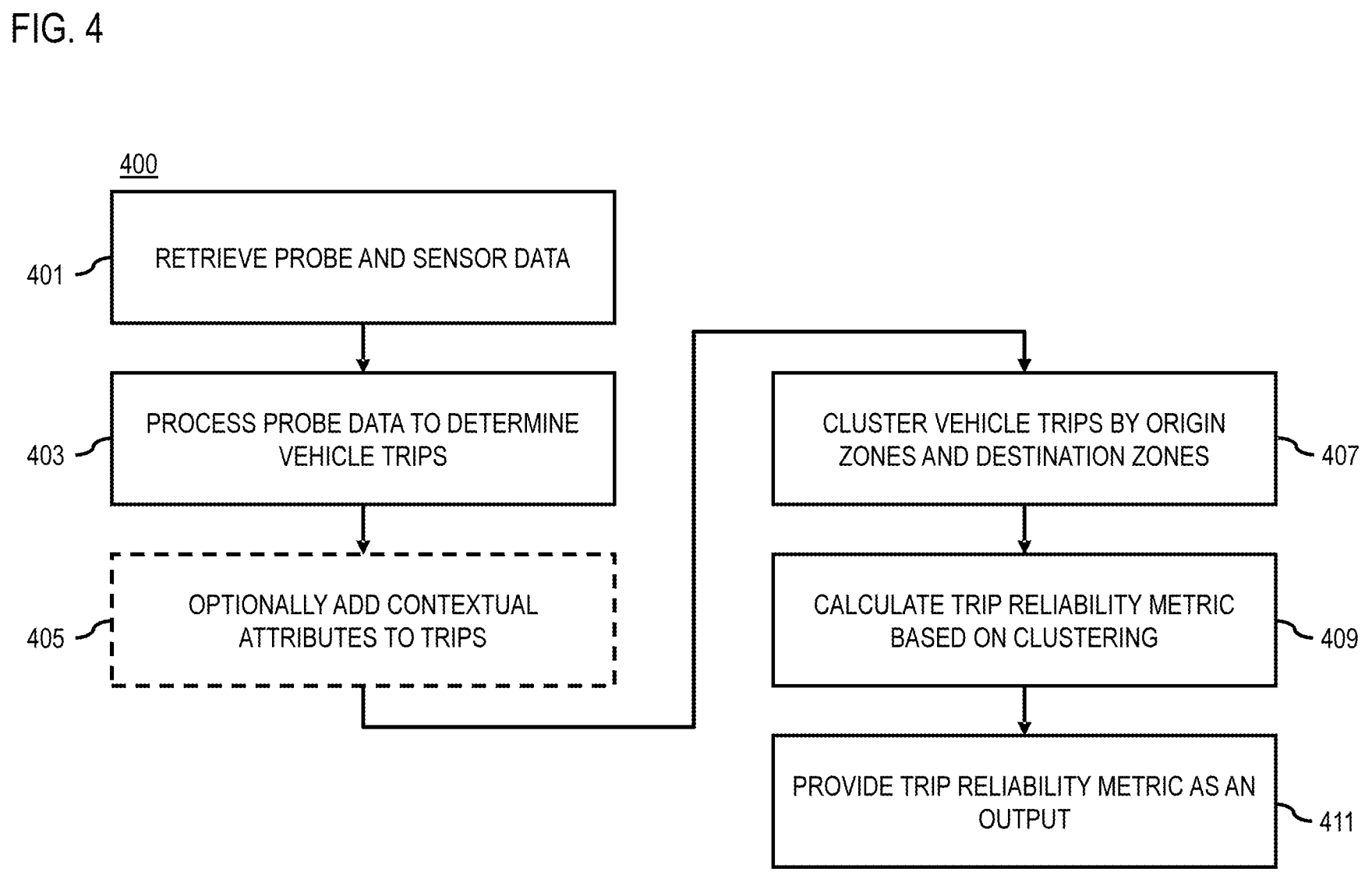

401 RETRIEVE PROBE AND SENSOR DATA

403 PROCESS PROBE DATA TO DETERMINE VEHICLE TRIPS

405 OPTIONALLY ADD CONTEXTUAL ATTRIBUTES TO TRIPS

407 CLUSTER VEHICLE TRIPS BY ORIGIN ZONES AND DESTINATION ZONES

409 CALCULATE TRIP RELIABILITY METRIC BASED ON CLUSTERING

411 PROVIDE TRIP RELIABILITY METRIC AS AN OUTPUT

Figure 11:
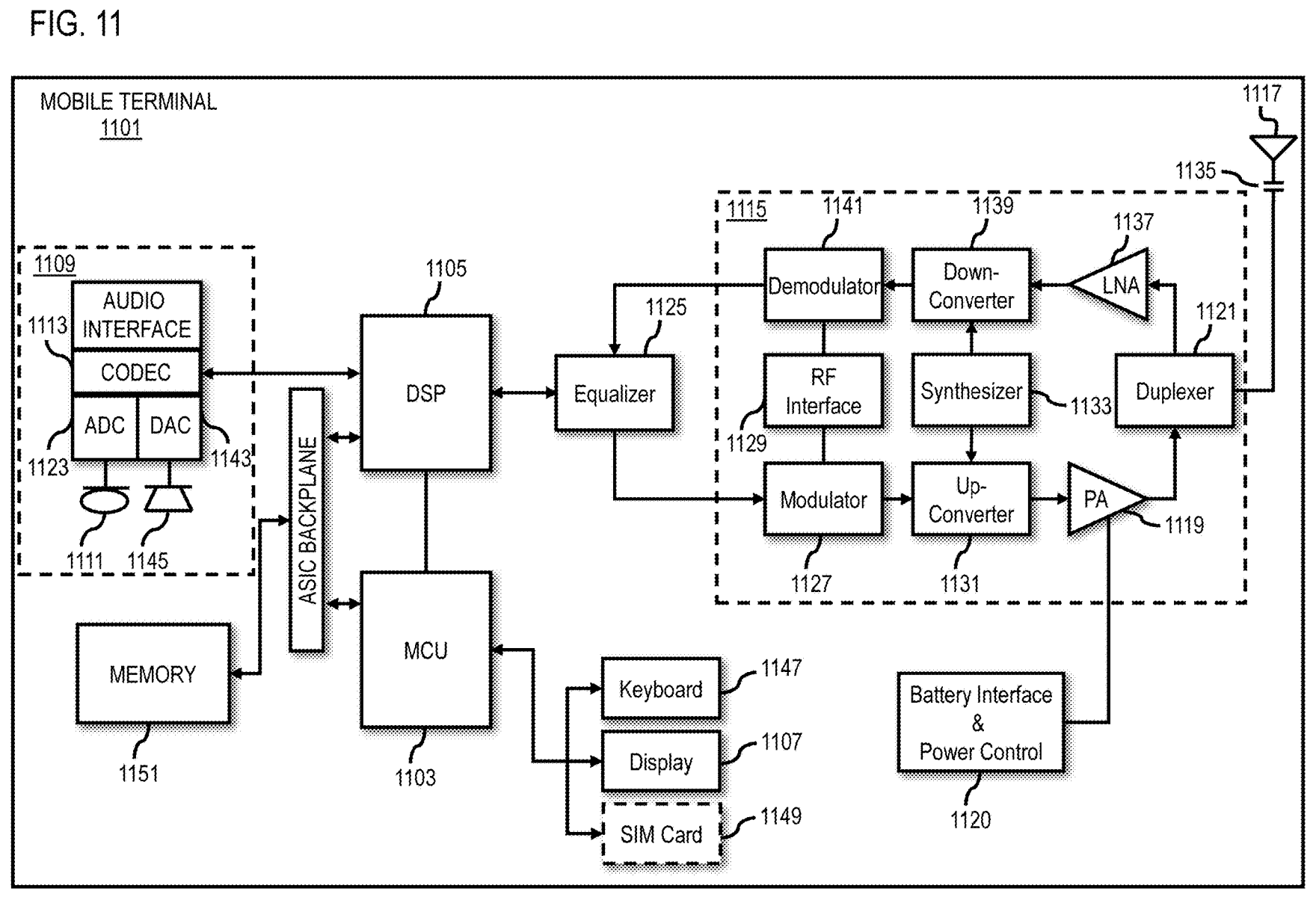

MOBILE TERMINAL
1101

1117
1135
1121 Duplexer
1137 LNA
1119 PA
1133 Synthesizer
1139 Down-Converter
1131 Up-Converter
1141 Demodulator
1129 RF Interface
1127 Modulator
1115
1120 Battery Interface & Power Control
1125 Equalizer
1147 Keyboard
1107 Display
1149 SIM Card
1105 DSP
1103 MCU
ASIC BACKPLANE
1109
1113 AUDIO INTERFACE
CODEC
1143 DAC
1123 ADC
1145
1111
1151 MEMORY

METHOD, APPARATUS, AND SYSTEM OF PROVIDING ZONE-TO-ZONE TRIP RELIABILITY ANALYSIS USING PROBE DATA

BACKGROUND

Providing accurate map and traffic data is a key function for mapping service providers. One approach to map making relies on collecting probe data over a large geographic area. However, scalable traffic monitoring over a large geographic generally requires efficient probe data processing with algorithms adapted for distributed computing environment. As a result, mapping service providers face significant technical challenges with respect to subdividing large geographic areas into zones for processing and analysis of probe data.

Some Example Embodiments

Therefore, there is a need for an approach for providing zone-to-zone trip reliability analysis using probe data.

According to one embodiment, a method comprises determining probe data collected from a plurality of sensors of a plurality of probe vehicles traveling in a geographic area of interest. The method also comprises processing the probe data to determine a plurality of vehicle trips. The method further comprises clustering the plurality of vehicle trips into one or more zone-to-zone trip categories based on the origin zones and destination zones of the plurality of vehicle trips. The method further comprises, for each zone-to-zone trip category of the one or more zone-to-zone trip categories, computing a zone-to-zone trip category reliability metric based on the plurality of vehicle trips clustered into each zone-to-zone trip category. The method further comprises providing the zone-to-zone trip category reliability metric for each zone-to-zone trip category as an output.

According to another embodiment, an apparatus comprises at least one processor, and at least one memory including computer program code for one or more computer programs, the at least one memory and the computer program code configured to, with the at least one processor, cause, at least in part, the apparatus to determine probe data collected from a plurality of sensors of a plurality of probe vehicles traveling in a geographic area of interest. The apparatus is also caused to process the probe data to determine a plurality of vehicle trips. The apparatus is further caused to cluster the plurality of vehicle trips into one or more zone-to-zone trip categories based on the origin zones and destination zones of the plurality of vehicle trips. The apparatus is further caused to compute, for each zone-to-zone trip category of the one or more zone-to-zone trip categories, a zone-to-zone trip category reliability metric based on the plurality of vehicle trips clustered into each zone-to-zone trip category. The apparatus is further caused to provide the zone-to-zone trip category reliability metric for each zone-to-zone trip category as an output.

According to another embodiment, a non-transitory computer-readable storage medium carries one or more sequences of one or more instructions which, when executed by one or more processors, cause, at least in part, an apparatus to determine probe data collected from a plurality of sensors of a plurality of probe vehicles traveling in a geographic area of interest. The apparatus is also caused to process the probe data to determine a plurality of vehicle trips. The apparatus is further caused to cluster the plurality of vehicle trips into one or more zone-to-zone trip categories based on the origin zones and destination zones of the plurality of vehicle trips. The apparatus is further caused to compute, for each zone-to-zone trip category of the one or more zone-to-zone trip categories, a zone-to-zone trip category reliability metric based on the plurality of vehicle trips clustered into each zone-to-zone trip category. The apparatus is further caused to provide the zone-to-zone trip category reliability metric for each zone-to-zone trip category as an output.

According to another embodiment, an apparatus comprises means for determining probe data collected from a plurality of sensors of a plurality of probe vehicles traveling in a geographic area of interest. The apparatus also comprises means for processing the probe data to determine a plurality of vehicle trips. The apparatus further comprises means for clustering the plurality of vehicle trips into one or more zone-to-zone trip categories based on the origin zones and destination zones of the plurality of vehicle trips. The apparatus further comprises means for computing, for each zone-to-zone trip category of the one or more zone-to-zone trip categories, a zone-to-zone trip category reliability metric based on the plurality of vehicle trips clustered into each zone-to-zone trip category. The apparatus further comprises means for providing the zone-to-zone trip category reliability metric for each zone-to-zone trip category as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of providing zone-to-zone trip reliability analysis using probe data, according to one example embodiment;

FIG. 4 is a flowchart of a process for zone-to-zone trip reliability analysis using probe data, according to one example embodiment;

FIG. 11 is a diagram of a mobile terminal (e.g., client terminal, vehicle, or part thereof) that can be used to implement an example embodiment.

DESCRIPTION OF SOME EMBODIMENTS

Figure 2:
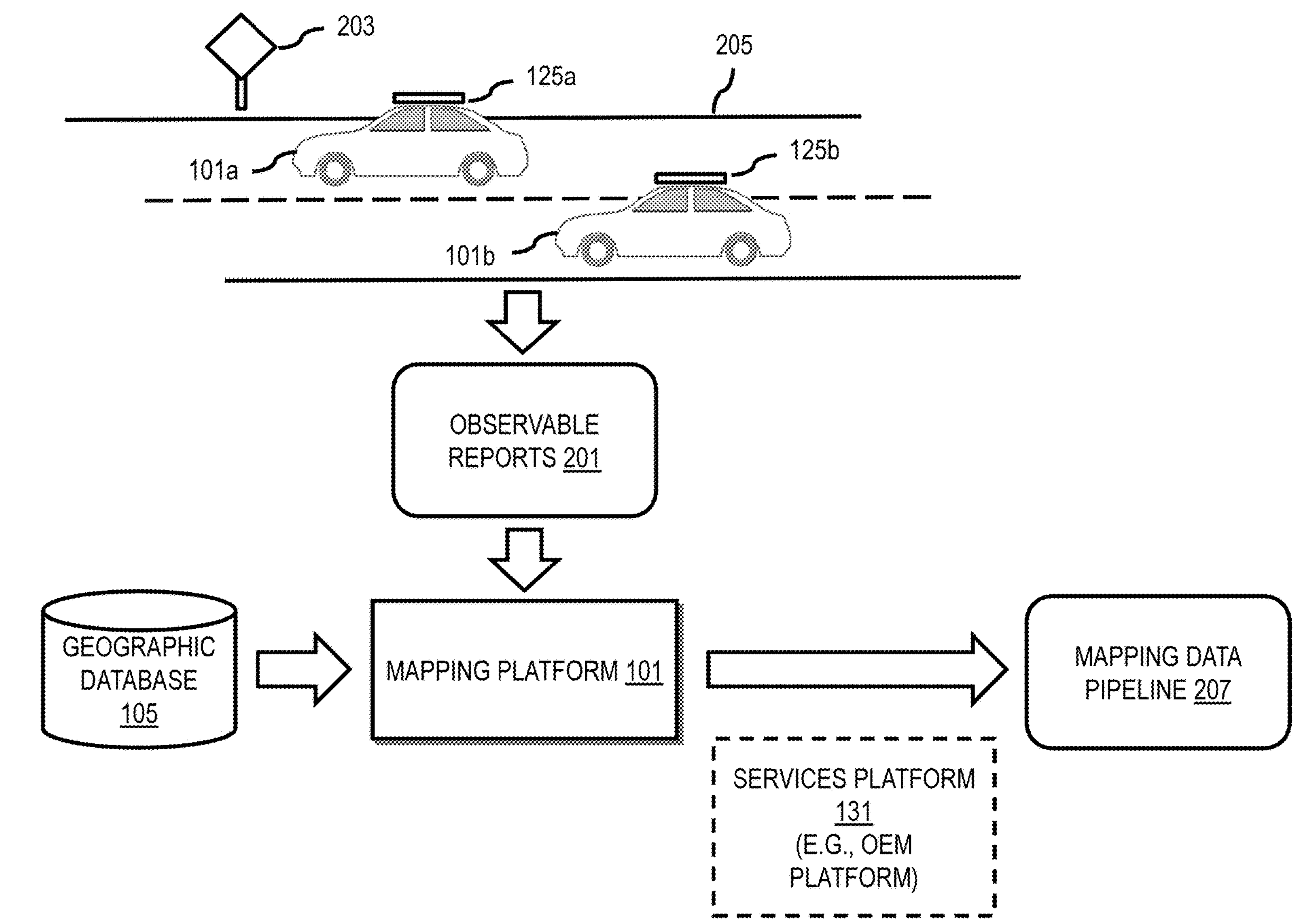
FIG. 2 is a diagram illustrating a data pipeline for providing zone-to-zone trip reliability analysis using probe data, according to one embodiment.

Examples of a method, apparatus, and computer program for providing zone-to-zone trip analysis using probe data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of providing zone-to-zone trip reliability analysis using probe data, according to one example embodiment. In one example embodiment, a trip can be defined from a start point (origin) to an end point (destination). More generally, the term "trip" refers to a journey involving travel (e.g., via vehicles 101*a*-101*n*—also collectively referred to as vehicles 101) from the origin to the destination. Each trip can be further defined by its purpose such as but not limited to shopping, doctor's appointment, working, commuting, socializing, etc. By way of example, below are abbreviations of example purpose of trips from OD (origin to destination):

H2W—Home to work
W2H—Work to home
W2O—Work to other
O2W—Other to work
H2O—Home to other
O2H—Other to home
O2O—Other to other
HBO—Home based other (includes H2O, O2H)
HBW—Home based work (H2 W, W2H)
NHB—Non-home based (O2 W, W2O, O2O)

In one embodiment, analyzing trip statistics can provide technical benefits such as but limited to improved estimated time of arrival (ETA) calculating, routing, and/or other similar location-based services and applications. In one embodiment, mapping service providers (e.g., operators of a mapping platform 103) can provide digital map data (e.g., map data stored in a geographic database 105) and/or other dynamic content data services that can use vehicle probe data 107 and/or sensor data 109 to build a trip database 111 to conduct such analysis. In some embodiment, trip patterns can be determined as well based on the trip database 111. For example, Analyzing trip data extracted from probe data 107 and/or sensor data 109 yields valuable insights into various mobility and transportation patterns. Origin-destination patterns can be identified by pinpointing common routes and discerning starting and ending points. In other words, in one embodiment, the trip data can encompass various origin-destination patterns, including but not limited to trip volume for each origin zone and destination zone pair. This involves collecting and recording information on the frequency and volume of trips between specific origin and destination zones within a given transportation network. The data provides insights into the demand and travel patterns between different geographic areas. For each origin-destination pair, the recorded trip volume indicates how many trips originate from a specific zone and conclude at a particular destination zone. This information is valuable for understanding the popularity of routes, identifying traffic hotspots, and informing transportation planning and management strategies. The inclusion of trip volume data in the trips dataset contributes to a comprehensive analysis of travel patterns and supports data-driven decision-making in the optimization of transportation systems.

Travel time and speed patterns (e.g., speed distributions of the identified trips) offer a comprehensive view of average travel times and speed fluctuations along specific routes and/or for the overall trip database 111. For example, for every origin zone and destination zone pair, the recorded travel time data indicates the average, minimum, maximum, and possibly other statistical measures reflecting the time it takes for a trip between these zones. Additionally, the speed patterns capture the distribution of speeds observed along these routes and/or for the overall trip database 111. For example, this data can be presented as speed distribution histograms, detailing the frequency of different speeds within a specific origin-destination pair and/or for the overall trip database 111. The data can also reveal congestion and traffic flow dynamics, helping to pinpoint areas prone to bottlenecks or congestion during specific times. Understanding trip frequency and duration enables the analysis of travel behavior over different time intervals, providing a nuanced understanding of commuting habits.

Additionally, classifying trips based on the mode of transportation, discerning trip purposes, and exploring spatial and temporal patterns offer comprehensive insights into the diverse aspects of mobility. Route preferences and parking behavior can be studied to identify preferred routes and popular parking areas. Moreover, anomaly detection techniques help uncover unexpected patterns, facilitating the identification of events such as accidents or road closures that influence trip patterns. These analyses collectively contribute to informed urban planning, efficient traffic management, and the enhancement of transportation infrastructure by leveraging data-driven insights into the movement of individuals within a given area.

Each trip consists of multiple road segments where the collected trip probe data 107 or sensor data 109 can be map matched. This trip data can be stored in the trip database 105 for detection and/or analysis (e.g., via the trips processing engine 113 of the mapping platform 103). As a result, trip data such as but not limited to each trip length, travel time, travel path, etc. can be determined. Such results can be used for fleet vehicle planning, transportation logistics, autonomous vehicle routing. In other example use cases, insurance companies can use trip data to generate insurance quotes as well.

In one embodiment, the mapping platform 103 include traffic systems (e.g., traffic processing engine 115) that take probes (e.g., probe data 107) from multiple resources as input and deliver flow or incident messages as output (e.g., via the flow/incident database 117) through the processing engine 115 (or equivalent component) as shown in FIG. 1. The messages are delivered to end customers (e.g., via client terminals 119 executing applications 121) in two ways either by over the air radio interfaces or by connected internet (e.g., over a communication network 123).

The inputs of the traffic processing engine 115 are real time probe data 107 including sensor data 109 received from mobile devices or probe vehicles 101 (e.g., equipped with sensors 125*a*-125*n*—also collectively referred to as sensors 125—capable of generating probe data 107), and map artifact data (e.g., map data of the geographic database 105) which describes the road segment topology and geometry. Upon receiving real time probe data 107 corresponding to one or more vehicles 101 travelling through road segments, a traffic processing engine 115 ingests these probes, performs steps such as map matching, travel time aggregation, etc. and thereby enabling the determination of the current travel speed for a given road segment (e.g., road link or traffic message channel (TMC)).

In one embodiment, based on the output speed category, the road traffic condition can be further described as free flow, queueing, stationary, etc. From a user perception perspective, driving speed equal to or lower than queueing speed would be considered as road congestion. The traffic feeds along with other attributes can then be fed into a routing engine 127 for estimated time of arrival (ETA) calculation. In one embodiment, ETA calculation can be based on a route-based approach as follows:

$$ETA_{route} = \sum_{i=1}^{n} t_{link}^{i} + t_{transition}^{i,i+1} \tag{1}$$

$t_{link}^{i}$:

estimated travel time on link i using the traffic information; and $t_{transition}^{i,i+1}$:

transition cost from link i to link i+1.

It is straightforward to have an accurate trip ETA estimation as long as the routing engine 127 can calculate an accurate travel time for each road segment and a transition time between the two adjacent connected road segments. For example, as shown in Equation (1) above, the travel time for each road segment is determined, often derived from historical data, real-time traffic updates, and/or predictive algorithms. This data accounts for factors such as road conditions, speed limits, and historical traffic patterns. Additionally, the transition time between two connected road segments is considered, encompassing the time taken to traverse intersections, make turns, or navigate any spatial shifts. Integrating these variables, the overall ETA is computed by summing the travel times of individual segments and factoring in the transition times between each connected pair of segments along the route. This comprehensive approach ensures a more accurate prediction of arrival times by accounting for the nuanced dynamics of travel, including both road-specific conditions and the seamless transitions between interconnected segments. The mapping platform 103 leverages these calculations to provide users with real-time and precise ETAs, enhancing the overall efficiency and reliability of travel planning.

However, estimating accurate travel times using traffic flow often requires traffic prediction to be accurate for many ETA related functions like navigation, ride sharing, fleet vehicle planning, etc. In one embodiment, the mapping platform 103 includes a traffic pattern system to generate traffic pattern data which is a static speed data for each road segment. In other embodiment, the traffic pattern system can also include detailed road segment travel time distribution information. To predict the traffic time in the future, the mapping platform 103 can blend real time traffic data and traffic pattern data and then fall back to traffic pattern data after certain time period. The fallback time period parameters are determined through the system tuning. For example, tuning can be based on how consistent or reliable the observed or predicted travel times are.

In one embodiment, travel time reliability (TTR) is defined by the Federal Highway Administration (FHWA) as "the consistency or dependability in travel times, as measured from day-to-day and/or across different times of the day" (FHWA, 2009). The concept of TTR has been raised and employed in different studies to define and measure this unpredictable variation of travel time. More specifically, according to the FHWA, travel time reliability is a key performance metric that gauges the consistency and predictability of travel times on roadways. It refers to the degree of variation or reliability in the time it takes to travel a specific route under similar conditions. In essence, a high level of travel time reliability indicates a more consistent and dependable commuting experience, where travelers can reasonably anticipate the duration of their journeys. Measuring travel time reliability is crucial because it provides valuable insights into the overall efficiency and effectiveness of transportation systems. For both individual commuters and businesses reliant on timely transportation, understanding and improving travel time reliability help mitigate uncertainties, reduce congestion, enhance productivity, and contribute to a more resilient and user-friendly transportation infrastructure. By identifying and addressing factors that contribute to travel time variability, authorities can implement targeted interventions to optimize traffic flow and create a more reliable transportation network.

Measuring travel time reliability poses technical challenges stemming from the intricacies of transportation systems and the dynamic nature of traffic conditions. The accuracy and availability of data are fundamental challenges, as acquiring real-time, precise information on traffic conditions can be hindered by limitations, inaccuracies, or delays, especially in areas with sparse sensor coverage. Integrating data from diverse sources, such as GPS devices, traffic sensors, and mobile apps, presents another challenge due to variations in data formats, standards, and quality. Achieving a fine spatial and temporal resolution in data is crucial for reliable assessments, yet challenges persist in capturing the nuanced details of congestion patterns. The dynamic nature of traffic conditions, influenced by factors like weather, accidents, and special events, necessitates adaptable measurement methodologies that can account for these variables. Additionally, addressing mode and route variability, as well as privacy concerns related to data collection, is imperative. The deployment and maintenance of infrastructure, such as traffic sensors and cameras, also present logistical and financial challenges in certain regions. Lastly, accurate modeling and prediction in the face of unpredictable events require sophisticated algorithms to enhance the reliability of travel time measurements. Overcoming these technical challenges is pivotal for advancing the accuracy and effectiveness of travel time reliability assessments, contributing to more resilient and efficient transportation systems.

For example, middle mile or last mile delivery systems, fleet vehicle dispatching system, ride sharing services, and/or the like are among industry sectors which require the accurate estimation of the travel time. Due to generally unpredictable factors like traffic incidents, weather, roadworks, probe data coverages, . . . etc., it can be technically challenging for mapping service providers to provide routing services to meet the quality demands, for instance, with respect to ETA calculation and prediction.

We are proposing a method and system of zone-to-zone clustering and further trip travel time reliability to be used for routing service to improve ETA. HERE MAP data, dynamic content data, trip data can be applied to run the trip reliability analysis by grouping the trips based on trip origin and trip destination to different zone/cluster (e.g., geographic zones corresponding to subdivisions of a larger geographic area).

To address these technical challenges, the system 100 of FIG. 1 is introducing a capability for providing zone-to-zone clustering or vehicle trips from probe data, and further determining trip travel time reliability to be used for routing service to improve ETA or even to control autonomous vehicle operation. In one embodiment, map data (e.g., geographic database 105), dynamic content data (e.g., probe data 107, sensor data 109, various contextual parameters, etc.), trip data (e.g., trip data base 111) can be applied to run various embodiments of the trip reliability analysis by grouping the trips based on trip origin and trip destination to different zone/cluster (e.g., zones as indicated in the zone footprint data 129). In one embodiment, the footprint data 129 can be used to match zones against points of interest or locations in the map data of the geographic database 105 to identify the purpose of the trip. For example, if the origin zone corresponds to home and the destination zone corresponds to work, then the purpose of the trip can be classified as a commute to work.

Clustering trips based on origin-destination zones rather than specific origin and destination points provides several technical advantages in the analysis of transportation and mobility patterns. This approach allows for a higher level of aggregation, offering a broader perspective on travel trends and congestion hotspots without delving into individual data points. Moreover, utilizing zones helps address privacy concerns associated with pinpointing exact locations, ensuring a level of anonymity for travelers. Simplifying the modeling of transportation systems, clustering at the zone level enables the application of statistical models that capture general behaviors without being overly influenced by specific outliers. From an urban planning perspective, understanding travel patterns between larger zones is crucial for strategic decision-making related to infrastructure development and traffic management. This zoning approach promotes effective traffic management strategies, facilitates data consistency, and provides a pragmatic solution for applications where precise location data may be challenging to obtain or subject to variations. Overall, clustering trips into origin-destination zones strikes a balance between privacy protection, data simplicity, and relevance for higher-level planning and analysis, making it a valuable approach in various embodiments described herein.

In one embodiment, each trip will be determined from a vehicle driving path (e.g., determined from probe data 107) and put into in trip database 111. Then, each trip will be indexed and aggregated by its origin and destination in terms of origin cluster/zone and destination cluster/zone. The reliability analysis will be based on zone-to-zone travel time or other metrics per predefined contextual parameters or factors such as but not limited to rush hour, non-rush hour, weather, etc. For example, to compute travel time reliability based on origin zones and destination zones instead of individual points, a systematic approach involves gathering historical or real-time data on travel times between defined geographic zones. These zones, encompassing broader areas than individual points, serve as the basis for aggregation. Travel time data for trips originating from each zone and heading to each destination zone is then aggregated, and summary statistics such as mean, median, percentiles, standard deviation, and/or the like are calculated for each zone-to-zone pair. Reliability metrics, such as the Coefficient of Variation (CV), are employed to assess the consistency and predictability of travel times, with a lower CV indicating higher reliability. Additionally, contextual parameters or factors contributing to variability in travel times are identified through analysis, considering variables like time of day, day of the week, or external factors (e.g., weather, traffic incidents, etc.). Time series analysis helps identify trends and patterns in travel time variability over time, aiding in understanding recurring patterns. Visualizations, such as heatmaps, offer a clear overview of reliability levels between different origin and destination zones.

In addition, in recent years, there has been significant development in the autonomous vehicle and electric vehicle sectors, supported by governments and automotive original equipment manufacturers (OEMs). Major countries such as the United States, China, and Germany have witnessed substantial growth in the sale of vehicles in both markets, and this growth is expected to continue in the coming decades. Combining autonomous driving technology with electric vehicle technology is likely to drive the fast-growing market of autonomous electric vehicles (AEVs). In this scenario, the trip reliability metrics generated according to various embodiments described can be used to automatically control autonomous vehicles to travel where trip reliability is above a designated threshold or highest among possible route options. This can result in improved on time performance particularly in commercial uses of autonomous vehicles (e.g., for delivery, ride sharing, etc.).

Analyzing trip data within zones and identifying start and end zones for trips (e.g., according to the various embodiment described herein) also provides distinct technical advantages in terms of the underlying compute infrastructure. A scalable computing environment is crucial for efficient processing and analysis of the increasing volume of data associated with numerous zones and detailed trip information. Real-time processing capabilities are essential, ensuring that trip data can be analyzed promptly for timely decision-making, and parallel processing enhances efficiency by simultaneously handling data from different zones (or origin zone-to-destination zone trip pairs). The underlying compute infrastructure should support seamless data integration, accommodating diverse sources such as traffic sensors and mapping services. Furthermore, advanced analytics, involving complex algorithms and machine learning, require a robust computing environment with ample computational power. Given the geographical nature of zones (e.g., geographic zones as used in the various embodiments described herein), the compute infrastructure must facilitate geospatial analysis for tasks like ETA calculation, route optimization, spatial visualization, and autonomous vehicle control. Adequate storage capacity is vital to manage the growing volume of trip data, and stringent security measures, including encryption and access controls, safeguard sensitive information. The adaptability and flexibility of the compute infrastructure are essential for accommodating changes in data formats, sources, and analysis requirements, ensuring its relevance in the dynamic field of transportation planning. Overall, a well-designed compute infrastructure (e.g., based on parallelized computing of zone and/or their clustered trip data) is fundamental for harnessing the advantages of zone-based trip data analysis and making informed decisions in the evolving landscape of transportation systems.

In one embodiment, mapping services providers via the mapping platform 103 are capable of collecting vehicle probe data 107 and/or vehicle sensor data 109 for trip or travel time reliability analysis. FIG. 2 is a diagram illustrating a data pipeline for providing zone-to-zone trip reliability using probe data, according to one embodiment. In one embodiment, the process for zone-to-zone trip reliability analysis can be performed as part of an automated and/or manual mapping pipeline as shown in FIG. 2. Automated refers, for instance, to operating the pipeline without manual intervention in all or a portion of the pipeline from data ingestion to output of the map data. As shown, the mapping platform 103 receives observable reports 201 as the vehicles 101*a*/101*b* travel on a road 203. In one embodiment, each observable report 201 includes probe and sensor data reports. The probe data for instance can indicate a location of the vehicle 101 along with a time stamp and probe identifier, and the sensor report can include sensor readings taken at the corresponding location. The sensor reading, for instance, include sensor data indicating a detected road objects 203—e.g., point features such as signs and/or the like. It is also contemplated that the sensor data can be any output of any sensor 125 equipped on the vehicle 101.

The mapping platform 103 aggregates and analyzes the observable reports 201 (e.g., from one or more vehicles 101) to determine trip data across travel zones, according to the various embodiments described herein. In one embodiment, the determined trip data can be used for analysis such as but not limited to traffic flow and/or traffic volume analysis between or among travel zones. The mapping data pipeline 207, for instance, can the trip data across travel zones to generate digital map data or real-time data of the geographic database 105 and/or to provide location-based services (e.g., to a vehicle 101 or other client terminal 119 executing an application 121). The mapping data pipeline 207, for instance, can further process, verify, format, etc. the trip data and/or any other data derived therefrom before publication, use, or updating of the digital map data and/or dynamic content of the geographic database 105.

In one embodiment, the mapping platform 103 can use any architecture for transmitting the observable reports 201, trip data across zones, and/or related information to the end user devices (e.g., the vehicle 101, client terminal 119 executing a client application 121, etc.) over a communication network 123. In one embodiment, the mapping platform 103 can also transmit or publish the trip and/or trip reliability data to a third-party services platform 131, one or more services 133*a*-133*m* (also collectively referred to as services 133) of the services platform 131, one or more content providers 135*a*-135*k* (also collectively referred to as content providers 135). When performing direct publishing, the transmission of the probe data 107, sensor data 109, trip data (e.g., from trip database 111), etc. is performed over the communication network 123 between the mapping platform 103 and one or more user devices (e.g., the vehicles 101, client terminal 119, etc.) directly. When publishing via a third-party, the transmission of the probe data, sensor data, trip data, etc. is performed over the communication network 123 between the mapping platform 103 and a third-party provider such as the services platform 131 (e.g., a vehicle OEM platform), services 133, and/or content providers 135.

Also, the mapping platform 103 is capable of detecting and reporting the road segment traffic flow information, volume information, and incident information (e.g., from flow/incident database 117) to support the services to be used for highly automated driving on L3, L4, and even further for L5 level autonomous driving for multiple purposes like road safety enhancement and routing navigation improvement. For example, the Society of Automotive Engineers (SAE) has established a classification system to categorize the different levels of automation in vehicles. This classification, known as the SAE J3016 standard, defines six levels, ranging from Level 0 (No Automation) to Level 5 (Full Automation).

Each level represents a different degree of automation, indicating the extent to which a vehicle can perform driving tasks without human intervention. At Level 0 (No Automation), there is no automation, and the human driver is responsible for all aspects of driving. The vehicle may have some basic driver assistance features, but they do not constitute automation. Level 1 (Driver Assistance) involves driver assistance systems that can handle either steering or acceleration/deceleration tasks. However, the human driver must remain engaged and monitor the environment, as these systems are not fully autonomous. At Level 2 (Partial Automation), the vehicle can manage both steering and acceleration/deceleration simultaneously under certain conditions. The driver must remain vigilant and be ready to take control when necessary. Examples include advanced adaptive cruise control and lane-keeping assistance. Level 3 (Conditional Automation) vehicles can perform most driving tasks autonomously under specific conditions, such as highway driving. The driver can disengage from active control, allowing the system to operate independently. However, the driver must be ready to take over if the system encounters a situation it cannot handle. At Level 4 (High Automation), the vehicle is capable of full autonomy in specific scenarios or environments, such as urban areas or dedicated lanes. The system can manage all aspects of driving without human intervention within these predefined conditions. Outside of these scenarios, human intervention may be required. Level 5 (Full Automation) represents full automation, where the vehicle can handle all driving tasks in all conditions without human intervention. Level 5 vehicles do not require a steering wheel or pedals, as there is no need for human control. In one embodiment, the level of autonomy can be another vehicle attribute, and the system 100 can determine trip data across travel zones based on the different levels of vehicle autonomy.

In summary, partitioning probe data, sensor data, and/or trip data based on zones delivers notable technical benefits that enhance the underlying compute infrastructure. By organizing data into specific partitions corresponding to individual zones, the system achieves more efficient processing. This targeted approach enables parallelization of data analysis, allowing different compute resources to concurrently handle data from distinct zones. The optimized resource allocation ensures that each zone receives the necessary computing power, contributing to a scalable and adaptable infrastructure. For real-time processing, partitioning by zone reduces latency, providing swift insights into dynamic transportation conditions. Additionally, this strategy improves data retrieval and accessibility, allowing analysts to access relevant datasets with ease. Partitioning enhances data security and privacy by enabling precise application of access controls and encryption measures to specific partitions. Focused analysis and decision-making are facilitated, as planners can concentrate on the characteristics and challenges of each zone or zone-to-zone pair, leading to more targeted interventions and policies. In other words, partitioning probe and sensor data by zone optimizes the efficiency, scalability, and responsiveness of the compute infrastructure, aligning with the specific requirements of transportation planning and analysis.

Integrating trip data across zone-to-zone pairs (e.g., origin and destination zone pairs) amplifies the technical benefits derived from partitioning probe and sensor data, offering a holistic understanding of transportation dynamics. This broader perspective enables comprehensive analysis, allowing planners to discern overarching trends and dependencies within and between zones. The availability of trip data across zones facilitates cross-zonal optimization, providing opportunities to streamline routes and coordinate traffic signals for enhanced overall transportation efficiency. The scalability of the compute infrastructure is further improved, accommodating the evolving transportation network's increased data volumes and complexities. Integrated parallel processing gains efficiency by considering relationships and dependencies between diverse zones simultaneously. Access to trip data across zones contributes to enhanced predictive modeling, aiding planners in anticipating traffic patterns not only within individual zones but also during transitions between them. Holistic resource allocation becomes possible, ensuring a balanced and efficient use of computational resources to optimize the entire transportation network. The integration of security measures is more comprehensive, with uniform application across interconnected zones, meeting data protection requirements consistently. A cross-zonal perspective on trip data informs strategic infrastructure investments, enabling planners to allocate resources strategically based on a holistic understanding of transportation needs. Overall, providing trip data across travel zones enhances the technical advantages associated with partitioning probe and sensor data, fostering a more interconnected and informed approach to transportation planning.

Figure 3:
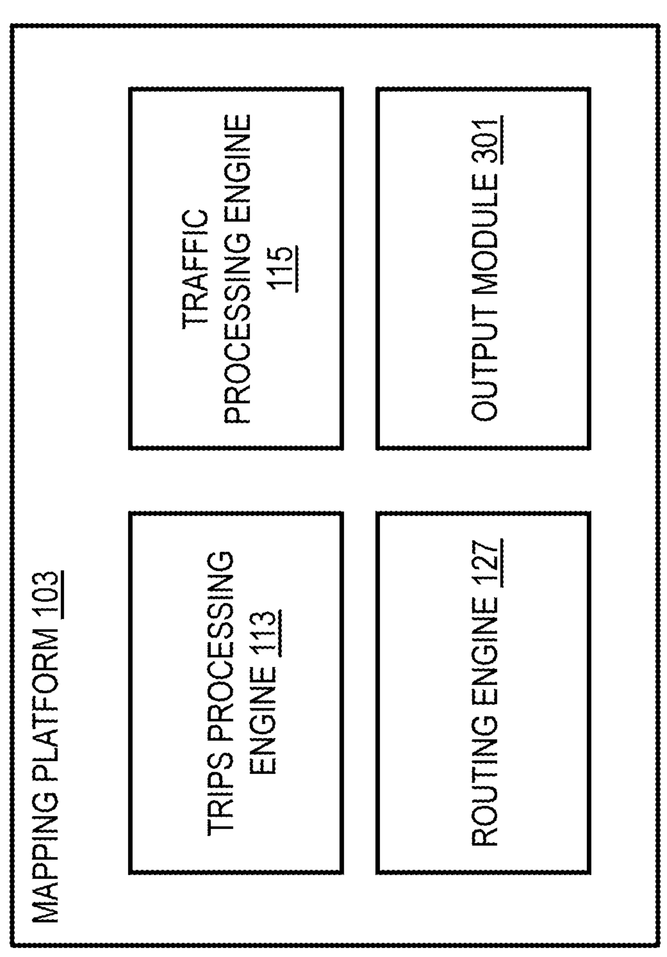
FIG. 3 is a diagram of a mapping platform for zone-to-zone trip reliability analysis using probe data, according to one example embodiment.

FIG. 3 is a diagram of a mapping platform 103 for zone-to-zone trip reliability analysis using probe data, according to one example embodiment. By way of example, the mapping platform 103 includes one or more components for performing the various embodiments described herein. It is contemplated that the functions of these components may be combined or performed by other components of equivalent functionality. In one embodiment, the mapping platform 103 includes a trips processing engine 113, traffic processing engine 115, routing engine 127, and an output module 301. The trips processing engine 113, for instance, analyzes probe data 107 and sensor data 109 to determine vehicle trajectories and identify the origin and destination zones for each vehicle path (e.g., via map matching of the vehicle trajectories or paths). These trajectories or paths capture details such as speed variations and route selections. The traffic processing engine 115 processes probe data 107 and sensor data 109 to determine traffic conditions (e.g., speed, flow, volume) on road segments (e.g., in real-time or based on historical probes). The routing engine 127 uses one or more routing algorithms (e.g., Dijkstra, A*, etc.) that considers various factors such as but not limited to distance, travel time, and potential congestion to determine a recommended route from an origin to a destination. The above presented modules and components of the mapping platform 103 can be implemented in hardware, firmware, software, or a combination thereof such as but not limited to the hardware illustrated in FIGS. 9-11. Though depicted as a separate entity in FIG. 1, it is contemplated that the mapping platform 103 may be implemented as a module of any of the components of the system 100 (e.g., a component of the vehicle 101, services platform 131, services 133, content providers 135, client terminal 119, application 121, etc.). In another embodiment, one or more of its modules or components may be implemented as a cloud based service, local service, native application, or combination thereof. The functions of the mapping platform 103 and its modules and components are discussed with respect to the figures below.

Figure 10:
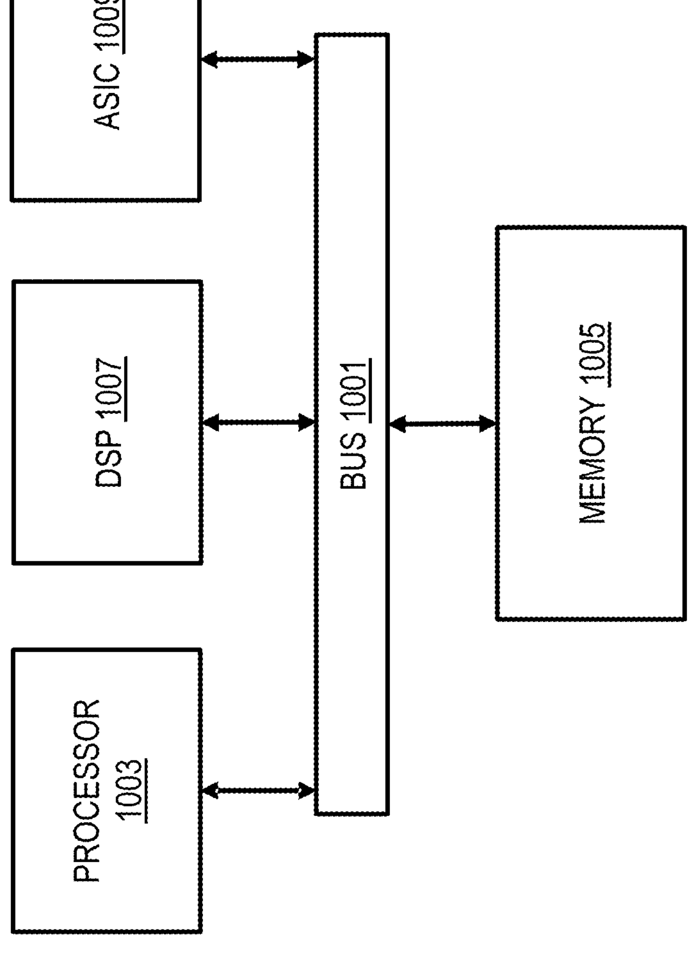
FIG. 10 is a diagram of a chip set that can be used to implement an example embodiment.

FIG. 4 is a flowchart of a process for zone-to-zone trip reliability analysis using probe data, according to one example embodiment. In various embodiments, the mapping platform 103 and/or any of its modules or components may perform one or more portions of the process 400 and may be implemented in, for instance, a chip set including a processor and a memory as shown in FIG. 10 or in circuitry, hardware, firmware, software, or in any combination thereof. As such, the mapping platform 103 and/or its modules or components can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the mapping platform 103 determines probe data collected from a plurality of sensors of a plurality of probe vehicles traveling in a geographic area of interest. Probe data, in the context of location and position sampling, refers to a dataset comprising a sequence of location coordinates captured from a probe vehicle at a designated frequency. Essentially, it represents the continuous recording of the probe vehicle's spatial coordinates over time as it moves through a specific geographic area. The location coordinates include information such as latitude, longitude, possibly altitude, a timestamp, and an identifier to associate a sequence of the location coordinates providing a precise record of the probe vehicle's position at each sampled instance. The designated frequency determines how often these location coordinates are sampled, reflecting the temporal granularity of the data collection. For example, if the designated frequency is set to one second, the probe data will include a new set of location coordinates every second, offering a detailed and time-stamped representation of the probe vehicle's movement.

In one embodiment, the probe data is collected in real-time, and wherein the zone-to-zone trip reliability metric is dynamically updated in real-time. For example, probe data collection for real-time monitoring of trip reliability involves the deployment of GPS-enabled devices or sensors in vehicles traversing the transportation network. These probes, often integrated into vehicles or mobile devices, continuously transmit location and movement data to a centralized system. As vehicles move, the probes provide real-time updates on their positions, speeds, and directional changes. This continuous stream of data forms the basis for monitoring and analyzing trip reliability. By aggregating and processing this information, transportation authorities can derive insights into current traffic conditions, identify congestion points, and assess the reliability of travel times along specific routes. This real-time monitoring approach allows for swift responsiveness to changing traffic patterns, enabling authorities to implement dynamic traffic management strategies, reroute vehicles, and communicate timely information to commuters. The integration of probe data in real-time systems enhances the overall understanding of transportation dynamics, contributing to more effective decision-making and improved trip reliability monitoring for commuters.

In step 403, the mapping platform 103 processes the probe data to determine a plurality of vehicle trips. For example, the mapping platform 103 can group sequences of probe location data points by probe or vehicle ID so that all location points collected for a given probe or vehicle are grouped. The locations points are then ordered chronologically to represent a path taken by the vehicle or probe over a period of time. Each path taken by each identified probe or vehicle is considered to be trip. The trip (e.g., collection of ordered probe data points belonging to an individual probe or vehicle) can then be stored in the trip database 111 for subsequent processing.

In optional step 405, the mapping platform 103 determines one or more contextual attributes of the plurality of vehicle trips. In one embodiment, the one or more contextual attributes include a time epoch, an environmental condition, a vehicle attribute, or a combination thereof. Then, the zone-to-zone trip category reliability metric is determined with respect to the one or more contextual attributes.

In step 407, the mapping platform 103 clusters the plurality of vehicle trips into one or more zone-to-zone trip categories based on the origin zones and destination zones of the plurality of vehicle trips. In one embodiment, the origin zones, the destination zones, or a combination thereof are predefined. In another embodiment, the origin zones, the destination zones, or a combination thereof are dynamically adjusted based on the probe data, the plurality of trips, or a combination thereof. In other words, to enhance the understanding of travel dynamics, trips can be associated with various contextual attributes or parameters. This involves integrating additional information related to each trip to provide a more comprehensive view. Time epoch data, including timestamps, allows for the categorization of trips based on temporal patterns, such as rush hours or specific times of the day. Environmental conditions, encompassing factors like weather and road conditions, offer valuable insights into the impact of external factors on travel behavior. Associating trips with vehicle attributes, such as type, model, or fuel efficiency, enables the analysis of how different vehicle characteristics influence traffic flow. Recording traffic events, including accidents or road closures, adds context to trip data and aids in assessing route reliability under diverse circumstances. Considering the geographic context, purpose of the trip, user preferences, and economic factors further enriches the analysis, providing a nuanced understanding of travel patterns. This holistic approach to contextual association facilitates more informed decision-making in areas such as traffic management, infrastructure planning, and the development of user-centric transportation solutions.

As used herein, a contextual attribute or parameter refers to a specific characteristic or factor associated with a particular context, situation, or set of circumstances. In various domains, including data analysis, urban planning, and system design, contextual attributes provide additional information that helps characterize and understand the environment or conditions in which certain events (e.g., trips) or entities exist. These attributes contribute context-specific details, such as time, location, environmental conditions, and other relevant variables, enriching the understanding and interpretation of data or processes within a given context.

In one embodiment, the mapping platform 103 map matches the plurality of vehicle trips to map data of a geographic database. Map matching the vehicle path for each probe vehicle involves aligning the trajectory and location data from the vehicle's sensors to specific road segments defined in the map data. The mapping platform 103, for instance, can use spatial indexing techniques to efficiently search for candidate road segments within the map data that closely match the location coordinates of the probe vehicle at different points in time. The mapping platform 103, for instance, can use a map matching algorithm to determine the most likely road segment or segments that correspond to the observed trajectory of the probe vehicle. Various algorithms, such as Hidden Markov Models (HMM), Kalman filtering, or graph-based matching, may be employed based on the complexity of the road network and the quality of the probe data.

Then, the origin zones and the destination zones are determined based on the map matching. In one embodiment, to ascertain the origin and destination zones for each trip determined from the probe data, a systematic approach is employed. Initially, probe data is collected, including location coordinates and timestamps, forming the basis for understanding the path of each vehicle. Spatial and temporal analyses are then applied to pinpoint the starting point of the vehicle's journey, considering both the initial location coordinates and the chronological sequence of data points. Path-tracking mechanisms (e.g., based on the map matching) trace the vehicle's route through successive sets of location coordinates. Spatial indexing and clustering techniques efficiently group these coordinates, aiding in the identification of spatial patterns indicative of the origin and destination zones. Similar analyses are applied to determine the conclusion of the vehicle's journey. The integration of probe data with detailed map information, including road segments and intersections, enhances the precision of associating zones with specific geographic features. Continuous monitoring mechanisms adapt to real-time changes in the vehicle's path, ensuring dynamic responsiveness. Data validation processes refine the determination based on feedback mechanisms, addressing any anomalies in the probe data. Ultimately, the identified origin and destination zones are integrated into the overall system or application, providing valuable information for transportation planning and decision-making processes.

In one embodiment, a zone, in the context of geographic analysis, can be any predefined or dynamically adjusted geographic area based on available probe data. These zones are demarcated for the purpose of spatial analysis, often representing specific regions or areas of interest within a larger geographic context. Predefined zones may be established based on regular shapes (e.g., polygons, circles, etc.), administrative boundaries, city planning divisions, or other predetermined criteria. On the other hand, dynamically adjusted zones are defined in real-time or periodically based on the analysis of available probe data, ensuring they adapt to the evolving patterns of movement and activity in a given area. These zones serve as spatial units for aggregating and analyzing data, facilitating a more granular understanding of geographic patterns, traffic flow, and other location-specific phenomena. The flexibility to adjust zones dynamically allows for a responsive and adaptive approach to geographic analysis, aligning with the dynamic nature of transportation and urban environments.

By determining the origin and destination zones of each trip from probe data, it becomes possible to categorize each trip into zone-to-zone trip categories, wherein each category corresponds to a unique combination of an origin zone and a destination zone pair. This categorization involves systematically organizing the trips based on their starting and ending geographic locations. For each trip, the identified origin and destination zones form a distinct zone-to-zone trip category. These categories serve as a structured framework for analyzing travel patterns, identifying common routes, and evaluating the reliability (e.g., travel time reliability) of trips between specific geographic pairs. The resulting data allows for a detailed examination of the interactions between different zones, enabling insights into commuting trends, congestion hotspots, and overall transportation dynamics within a given area. This categorization approach forms the foundation for a more in-depth understanding of the origin-destination relationships in the context of probe data analysis.

In step 409, for each zone-to-zone trip category of the one or more zone-to-zone trip categories, the mapping platform 103 computes a zone-to-zone trip category reliability metric based on the plurality of vehicle trips clustered into each zone-to-zone trip category. In one embodiment, the mapping platform 103 processes trip data associated with the plurality of vehicle trips in each zone-to-zone trip category to determine one or more statistical parameters. The trip data, for instance, can include but is not limited to a zone-to-zone travel time. The zone-to-zone trip category reliability metric is computed based on the one or more statistical parameters. By way of example, the one or more statistical parameters include a mean, median, one or more percentiles, or a combination thereof.

In other words, for each zone-to-zone trip category within the one or more designated categories, the mapping platform 103 performs a computation of a zone-to-zone trip category reliability metric. This metric is derived from the analysis of a plurality of vehicle trips that fall into each specific zone-to-zone category. In a particular embodiment, the mapping platform 103 processes trip data associated with the numerous vehicle trips encompassed by each zone-to-zone trip category to ascertain one or more statistical parameters. This trip data, which may involve factors like zone-to-zone travel time, serves as the dataset for the reliability analysis. The zone-to-zone trip category reliability metric is then computed based on the identified statistical parameters. To elaborate, the statistical parameters considered may include, but are not limited to, metrics such as mean travel time, median travel time, one or more percentiles (e.g., or a combination thereof. By leveraging these statistical measures, the mapping platform provides a quantifiable and informative metric that reflects the reliability of travel times for the specified zone-to-zone trip category.

In one embodiment, the reliability metric can be based on a coefficient of variation (CV) or any other equivalent statistical measure. A CV, for instance, is a measure of relative variability and can be used to quantify travel time reliability. In one embodiment, for travel time data or equivalent trip data (e.g., travel distance, fuel consumption, etc.), the coefficient of variation is calculated as the ratio of the standard deviation (c) to the mean travel time (u), expressed as a percentage. The formula for the coefficient of variation (CV) is as follows:

$$CV = \left(\frac{\sigma}{\mu}\right) \times 100 \quad (2)$$

where CV is the coefficient of variation, σ is the standard deviation of travel times, and u is the mean travel time. In some embodiments, the standard deviation σ can be replace with the median, a percentile (e.g., 50%, 80%, 95% percentile, etc.), or any other equivalent statistical measure.

In one embodiment, this equation (2) provides a standardized measure of variability relative to the mean, expressed as a percentage. A lower CV indicates higher reliability, as it suggests that travel times are more consistent and less variable around the mean. Conversely, a higher CV indicates greater variability in travel times, which may be indicative of less reliable transportation conditions. It is noted that this coefficient of variation is provided by way of illustration and not as a limitation. It is contemplated that the travel time reliability or zone-to-zone trip category reliability metric can be computed using any process based on the trip data in the corresponding zone-to-zone trip category.

In step 411, the mapping platform 103 provides the zone-to-zone trip category reliability metric for each zone-to-zone trip category as an output. In one embodiment, the zone-to-zone trip category reliability metric output from the mapping platform 103 can be stored in a database for subsequent retrieval or visualized through a user interface on a display device. This dual capability allows users to efficiently archive the trip information for future reference and analysis. Moreover, the user-friendly interface on a display device facilitates real-time visualization, enabling immediate access to insights and trends derived from the trip data. For example, the mapping platform 103 or other client can render the output in a user interface of a display device to visualize the trip reliability data.

Figure 5:
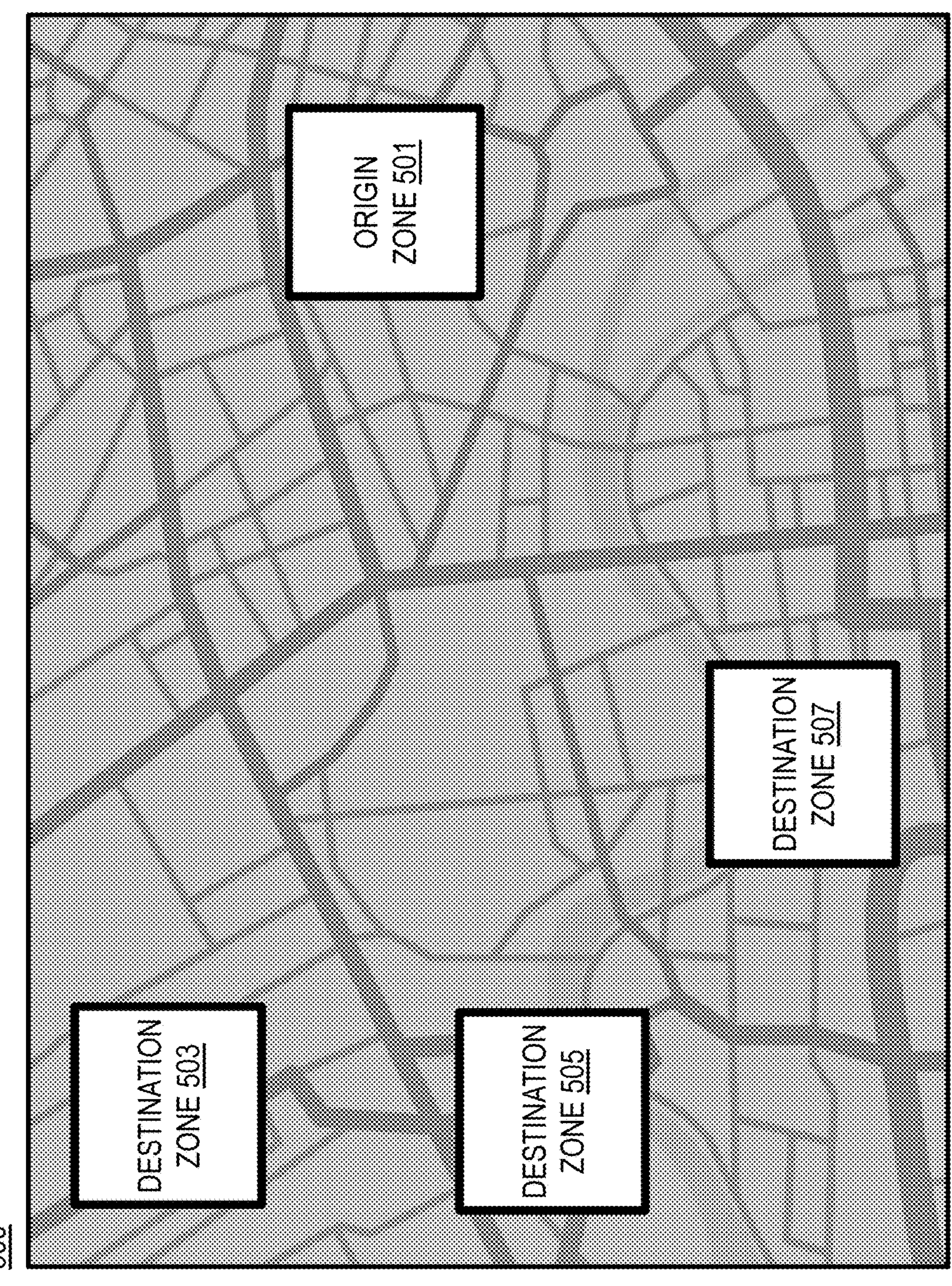
FIG. 5 is a diagram of example trip data with one origin zone ending at three destination zones, according to one example embodiment.

FIG. 5 is a diagram of example trip data 500 with one origin zone 501 ending at three destination zones 503-507, according to one example embodiment. In this example, three zone-to-zone trip categories can be created: (1) a zone-to-zone trip category for trips from origin zone 501 to destination zone 503, (2) a zone-to-zone trip category for trips from origin zone 501 to destination zone 505, and (3) a zone-to-zone trip category for trips from origin zone 501 to destination zone 507. Trips extracted from the probe data are then classified into one of the three categories based on their respectively determined origin and destination zones. Each trip can then be stored in the trip database 111 and indexed according to their respective zone-to-zone trip category for analysis according to the various embodiments described herein. Accordingly, a zone-to-zone trip category reliability metric can be computed for each of the three zone-to-zone trip categories.

In one embodiment, the output is provided based on the one or more contextual attributes (e.g., if optional step 405 is performed). In other words, computing trip reliability data based on contextual parameters involves analyzing various factors influencing the trips. This process collects data on trip details and contextual parameters such as time of day, weather conditions, traffic events, etc. The data is then segmented based on these parameters to create subsets representing specific conditions like rush hours or adverse weather. Reliability metrics, using statistical measures like mean, median, or percentiles, are calculated for each segment, offering insights into travel time variability. Comparing reliability metrics across different segments helps identify patterns and variations in trip reliability. This approach also analyzes the impact of individual contextual parameters on travel time variability, aiding in understanding the most significant contributing factors. Computing trip reliability data with a contextual focus is important for providing a nuanced perspective on transportation dynamics, allowing for optimized planning, improved user experience, efficient resource allocation, and enhanced safety in transportation systems. It supports a responsive approach to transportation management, tailoring strategies to the specific conditions impacting trip reliability.

In one embodiment, the output can be used to automatically control an operation of an autonomous vehicle based on the zone-to-zone category reliability metric. For example, the trip reliability metric data can be a factor in controlling the operation of autonomous vehicles by offering real-time feedback on the predictability and dependability of the transportation environment. Autonomous vehicles can use this metric to make informed routing decisions, adapting their behavior dynamically based on the current reliability assessment. This includes adjusting speeds, making routing choices, and interacting with traffic management systems for coordinated optimization. The metric's integration into user interfaces allows passengers to be notified in advance of less reliable routes, providing them the opportunity to adjust plans accordingly. Over time, autonomous vehicle systems can learn from historical reliability metrics, improving their adaptability and efficiency in navigating diverse and dynamic environments. The metric also influences safety protocols, guiding the vehicle to operate more conservatively in areas with lower reliability. In essence, the trip reliability metric enhances the overall dependability of autonomous transportation systems, ensuring a smoother and safer experience for passengers and other road users.

Figure 6:
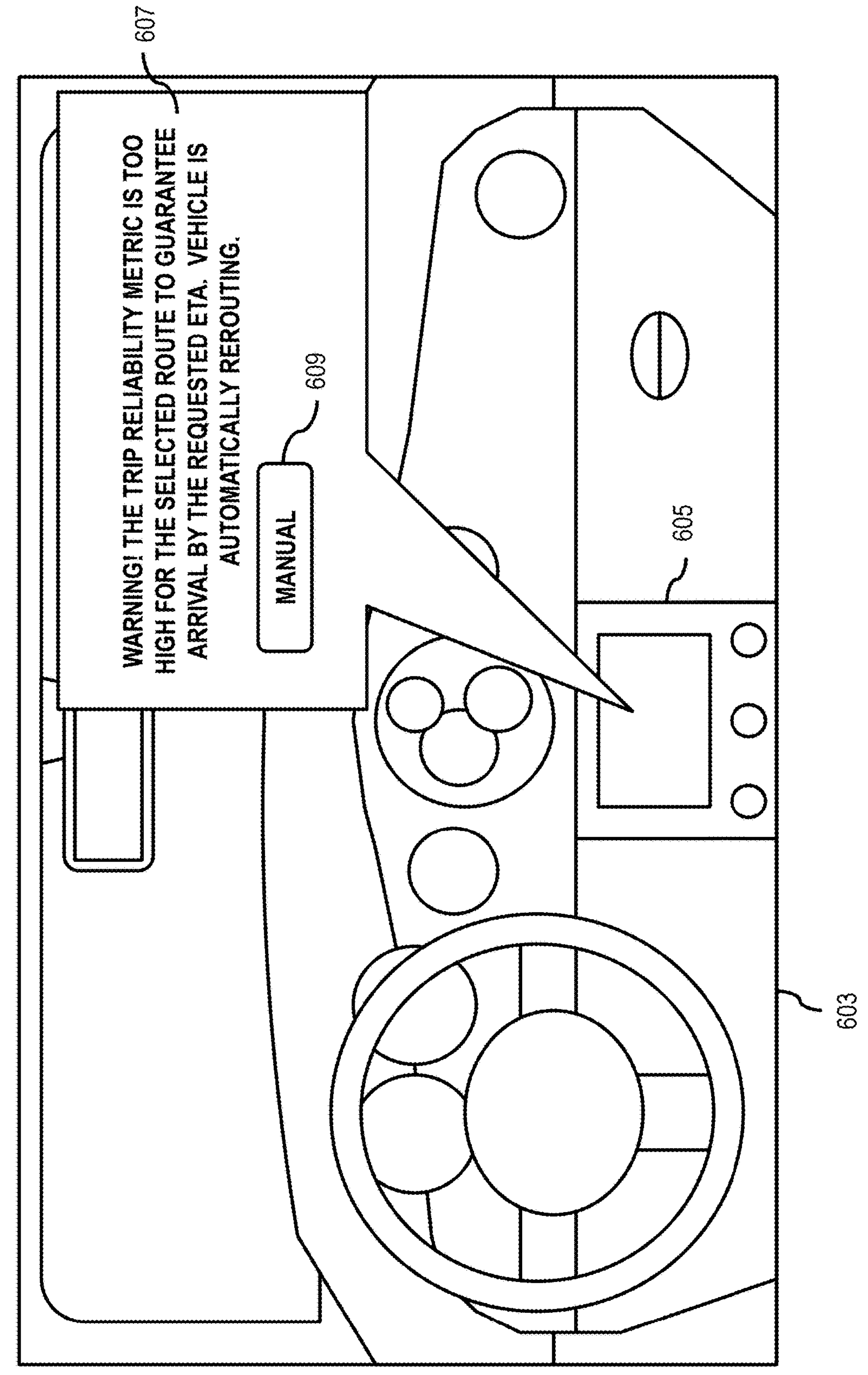
FIG. 6 is a diagram of an example of controlling an autonomous vehicle using zone-to-zone trip reliability trip data, according to one example embodiment.

FIG. 6 is a diagram of an example 601 of controlling an autonomous vehicle 603 using zone-to-zone trip reliability trip data, according to one example embodiment. In the example of FIG. 6, an autonomous vehicle 603 is configured to drive autonomously from an origin to a destination zone. A control system 605 of the vehicle 601 queries or otherwise determines a real-time trip reliability metric (e.g., from the trip database 111) for the origin and destination zone pair of its intended route. The determined trip reliability metric is compared against a threshold and is found to be too high to guarantee that the vehicle 603 will reach the destination by a passenger requested ETA. In response, the vehicle control system 605 automatically reroutes and controls the vehicle 603 to take a different route that will meet the trip reliability requirement to achieve the requested ETA. The vehicle control system 605 then initiates a display of an alert message 607 stating "Warning! The trip reliability metric is too high for the selected route to guarantee arrival by the requested ETA. Vehicle is automatically rerouting." The alert message 607 can also provide a user interface element 609 for the passenger to take over manual control of the autonomous vehicle 603 if the passenger disagrees with the vehicle 603's automatic rerouting decision.

In one embodiment, the mapping platform 103 provides the output as an input to a routing engine to compute an estimated time of arrival based on the zone-to-zone trip category reliability metric. For example, the mapping platform 103 outputs data, transmitting it to a routing engine for calculating ETAs based on the zone-to-zone trip category reliability metric. This process involves the generation of information on trip categories and reliability metrics, including statistical measures reflecting travel time variability. The routing engine utilizes this data to compute ETAs by considering statistical parameters such as mean travel time or percentiles. It dynamically adjusts these estimates in response to real-time changes in traffic conditions. The computed ETAs are integrated into user interfaces, providing real-time information for users to manage expectations during the journey. A continuous monitoring system maintains a feedback loop, updating reliability metrics and allowing the routing engine to adapt calculations based on evolving conditions, ensuring the accuracy of ETAs. Incorporating the reliability metric into the routing engine's decision-making process optimizes route planning and contributes to a more efficient and predictable transportation experience.

In one embodiment, the mapping platform 103 can build a linking database or mapping to link the zones used for clustering and indexing trips to corresponding one or more map tiles of a geographic database. In this way, the mapping platform 103 can convert the trip data between the zones and the one or more map tiles based on the linking database. Zones (e.g., indicated by the zone footprint database 129), in the context of the mapping platform 103, may not align with the conventional geographic divisions represented by map tiles in digital map of the geographic database 105. To bridge this distinction, the mapping platform 103 employs a strategy where it constructs a linking database or mapping. This database establishes a connection between the designated zones and their corresponding one or more map tiles within a geographic database. Through this linkage, the mapping platform 103 can convert and correlate trip data between the defined zones and the associated map tiles. This conversion is made possible by referencing the linking database, ensuring a coherent integration of trip information with the geographic representation provided by map tiles.

Figure 7:
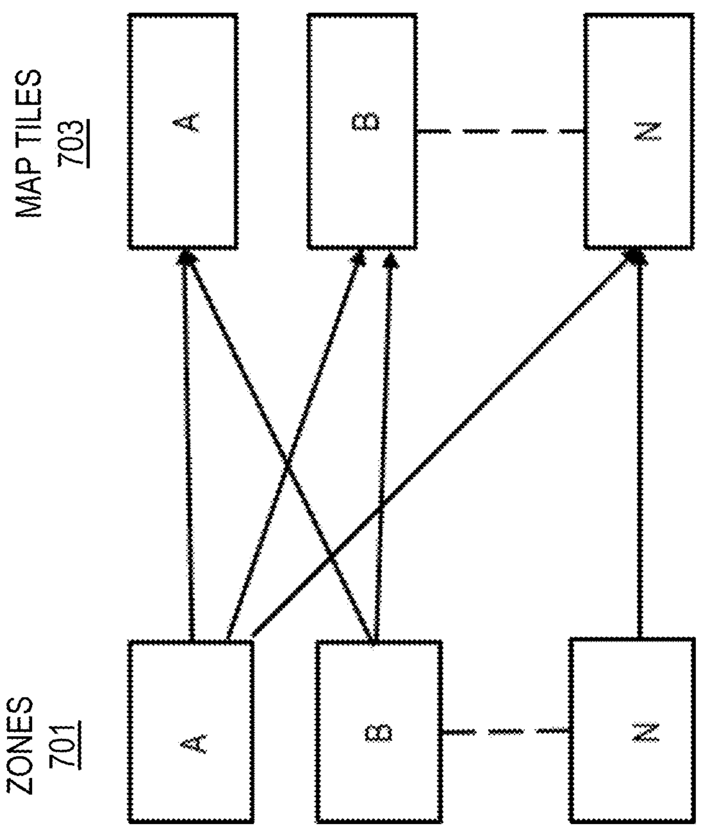
FIG. 7 is a diagram of linking mapping between zones and map tiles, according to one example embodiment.

FIG. 7 is a diagram of a mapping 700 between zones 701 and map tiles 703, according to one example embodiment. In this example, each zone 701 (e.g., marked A-N) can map to one to multiple tiles 703 (e.g., marked A-N), and vice versa. The mapping 700 shows the travel zone 701 to map tile 703 mapping relationship. For example, zone A covers a geographic area that includes at least portions of map tiles A, B, and N; zone B covers a geographic area that includes at least portions of map tiles A and B; and zone N covers a geographic area that includes a portion of map tile N.

In summary, in one example embodiment, the process 400 provides or facilitates zone-to-zone trip reliability analysis using probe data based on one or combinations of the following steps:

1. Retrieve vehicle probe data and determine the vehicle path.
2. Map match the vehicle path data and determine vehicles.
3. Cluster and index each vehicle trip by its origin zone and destination zone.
4. Associate trip attributes per predefined labeling based on contextual parameter, e.g., Weekday AM Peak (6 am to 10 am), Weekday Midday (10 am to 4 pm), Weekday PM Peak (4 μm to 8 pm), Weekend (6 am to 8 pm), weather, etc. in the trip database 111.
5. Group the trips by its starting point (origin) zone and end point (destination) zone.
6. Calculate the mean, median, 50%, 80%, or 95% percentile of each trip category.
7. Compute each zone-to-zone trip category reliability.
8. Return to step (4) compute each zone-to-zone trip category reliability by its associated contextual label.

Returning to FIG. 1, as shown and discussed above, the system 100 includes the mapping platform 103 for providing zone-to-zone trip reliability analysis using probe data. In one embodiment, the mapping platform 103 has connectivity or access to a one or more databases for storing the zone-to-zone trip reliability analysis performed according to the various embodiments described herein, and as well as a geographic database 105 for retrieving map data and/or related map attributes. In one embodiment, the geographic database 105 can include electronic or digital representations of mapped geographic features to facilitate trip reliability analysis. In one embodiment, the mapping platform 103 has connectivity over a communication network 123 to the services platform 131 that provides one or more services 133. By way of example, the services 133 may be third-party services that rely on location-based services created or developed to use zone-to-zone trip reliability analysis generated according to the various embodiments described herein. By way of example, the services 133 include, but are not limited to, autonomous/semi-autonomous vehicle operation, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 133 uses the output of the mapping platform 103.

In one embodiment, the mapping platform 103 may be a platform with multiple interconnected components. The mapping platform 103 may include multiple servers, intelligent networking devices, computing devices, components, and corresponding software for zone-to-zone trip reliability analysis. In addition, it is noted that the mapping platform 103 may be separate entities of the system 100, a part of the one or more services 133, a part of the services platform 131, or included within the vehicles 101 and/or client terminals 119.

In one embodiment, content providers 135 may provide content or data (e.g., including geographic data, 3D models, parametric representations of mapped features, etc.) to the mapping platform 103, the services platform 131, the services 133, the client terminals 119, the vehicles 101, and/or an application 121 executing on the client terminal 119. The content provided may be any type of content, such as probe data, sensor data, zone footprint data, map content, textual content, audio content, video content, image content, etc. used for probe vehicle analysis across travel zones. In one embodiment, the content providers 135 may also store content associated with the mapping platform 103, geographic database 105, services platform 131, services 133, client terminal 119, and/or vehicle 101. In another embodiment, the content providers 135 may manage access to a central repository of data, and offer a consistent, standard interface to data, such as a repository of the geographic database 105.

In one embodiment, the client terminal 119 and/or vehicle 101 may execute a software application 121 to capture sensor or other observation data (e.g., observables with relative position data) for processing by mapping platform 103 according to the embodiments described herein. By way of example, the application 121 may also be any type of application that is executable on the client terminal 119 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the mapping platform 103 and perform one or more functions associated with zone-to-zone trip reliability analysis alone or in combination with the mapping platform 103.

By way of example, the client terminal 119 is any type of computer system, embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client terminal 119 can support any type of interface to the user (such as "wearable" circuitry, etc.). In one embodiment, the client terminal 119 may be associated with the vehicle 101 or be a component part of the vehicle 101.

In one optional embodiment, the client terminal 119 and/or vehicle 101 are configured with various sensors for generating or collecting sensor observations (e.g., for processing by the mapping platform 103), related geographic data, etc. In one embodiment, the sensed data represents sensor data associated with a geographic location or coordinates at which the sensor data was collected to detect point features (e.g., road objects, road signs, landmarks, etc.). In this way, the sensor data can act as observation data that can be processed to provide zone-to-zone trip reliability analysis according to the various embodiments described herein. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road boundaries, road sign information, images of road obstructions, etc. for analysis), LiDAR, radar, an audio recorder for gathering audio data, velocity sensors mounted on steering wheels of the vehicles, switch sensors for determining whether one or more vehicle switches are engaged, and the like.

Other examples of optional sensors of the client terminal 119 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the client terminal 119 and/or vehicle 101 may detect the relative distance of the vehicle to a road boundary, the presence of other vehicles, pedestrians, traffic lights, potholes and any other objects, or a combination thereof. In one scenario, the sensors may detect weather data, traffic information, or a combination thereof. In one embodiment, the client terminal 119 and/or vehicle 101 may include GPS or other satellite-based receivers to obtain geographic coordinates or signal for determine the coordinates from satellites. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In another optional embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), 5G New Radio networks, Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 103, services platform 131, services 133, client terminal 119, vehicle 101, and/or content providers 135 optionally communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 8:
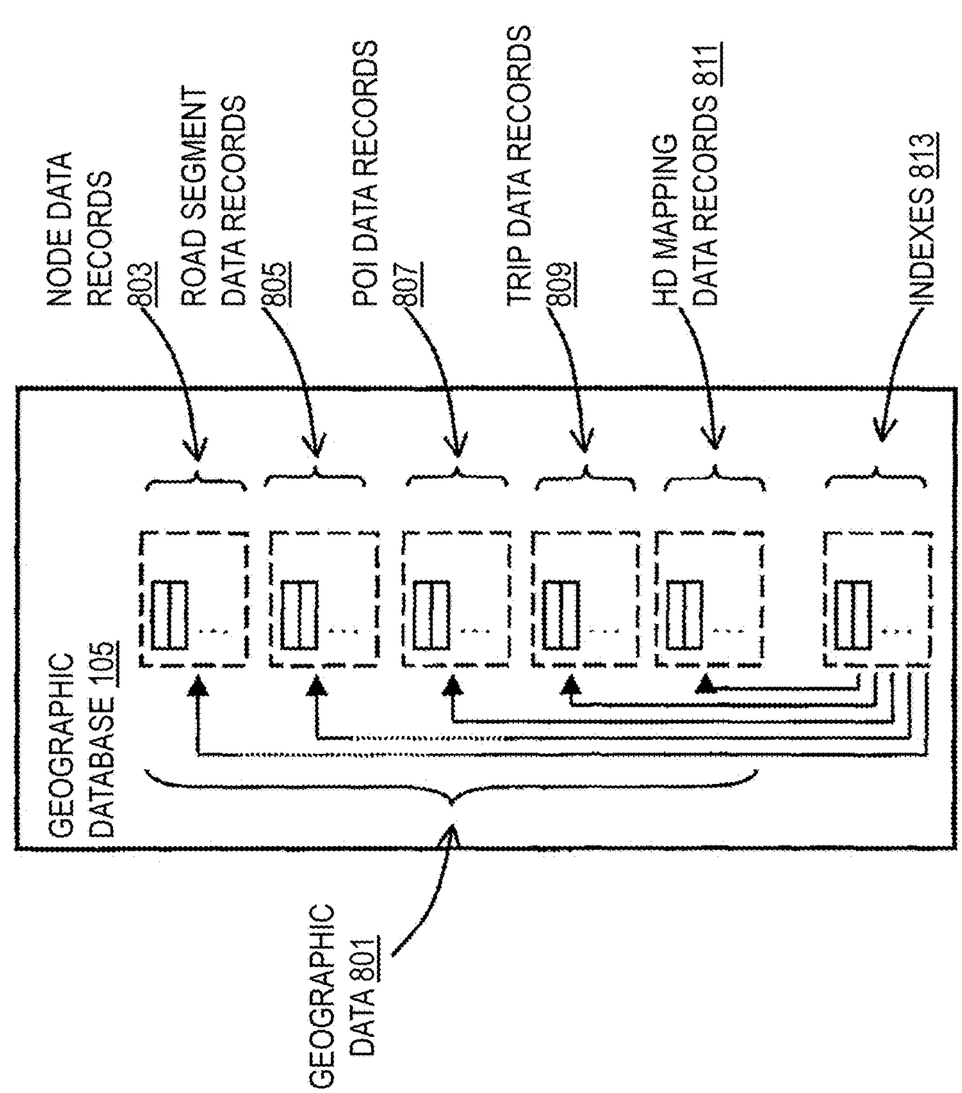
FIG. 8 is a diagram of a geographic database, according to one example embodiment.

FIG. 8 is a diagram of the geographic database 105, according to one embodiment. In one embodiment, the geographic database 105 includes geographic data 801 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 803, road segment or link data records 805, POI data records 807, trip data records 809, other records 811, and indexes 813, for example. More, fewer, or different data records can be provided. In one embodiment, additional data records (not shown) can include cartographic ("carto") data records, routing data, and maneuver data. In one embodiment, the indexes 813 may improve the speed of data retrieval operations in the geographic database 105. In one embodiment, the indexes 813 may be used to quickly locate data without having to search every row in the geographic database 105 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points (such as intersections) corresponding to the respective links or segments of the road segment data records 805. The road link data records 805 and the node data records 803 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 807. The geographic database 105 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 105 can also include trip data records 809 for storing zone-to-zone trip reliability analysis, zone-to-zone trip categories, probe data 107, sensor data 109, contextual parameters, vehicle attributes, zone footprint database 129, trip data alone or in combination with the trip database 111, and/or any other related information/data used and/or generated according to the various embodiments described herein. In one embodiment, the trip data records 809 can be associated with one or more of the node records 803, road segment records 805, and/or POI data records 807 to associate the zone-to-zone trip reliability data, trip data, zone data, etc. with specific geographic locations. In this way, the trip data can also be associated with the characteristics or metadata of the corresponding record 803, 805, and/or 807.

In one embodiment, the geographic database 105 can be maintained by the content provider 135 in association with the services platform 131 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or client terminal 119) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. Map layers may be utilized. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or client terminal 119, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing zone-to-zone trip reliability analysis using probe data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 9:
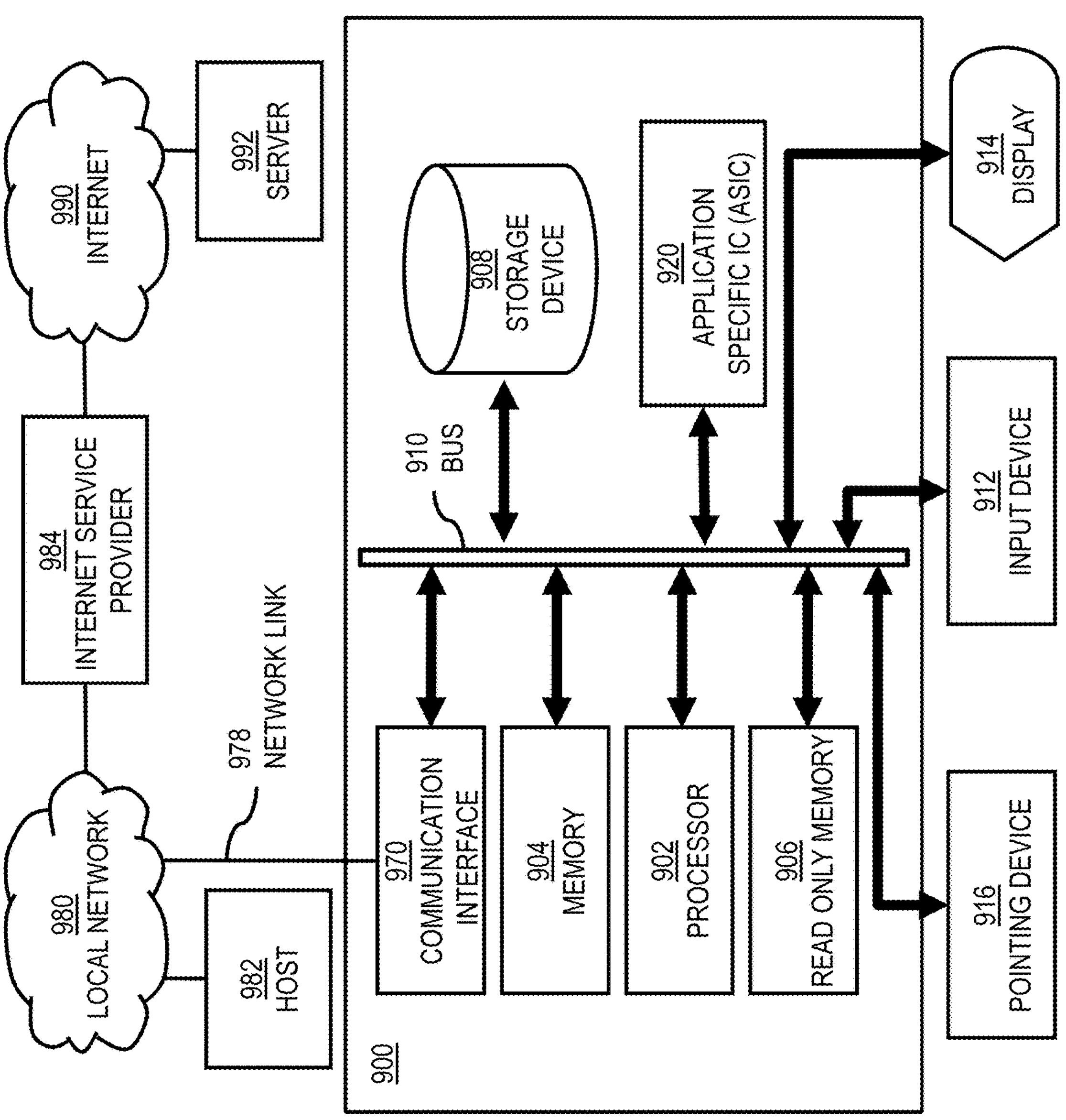
FIG. 9 is a diagram of hardware that can be used to implement an example embodiment.

FIG. 9 illustrates a computer system 900 upon which an embodiment of the invention may be implemented. Computer system 900 is programmed (e.g., via computer program code or instructions) to provide zone-to-zone trip reliability analysis using probe data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing zone-to-zone trip reliability analysis using probe data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing zone-to-zone trip reliability analysis using probe data. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing zone-to-zone trip reliability analysis using probe data, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 123 for providing zone-to-zone trip reliability analysis using probe data.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to provide zone-to-zone trip reliability analysis using probe data as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide zone-to-zone trip reliability analysis using probe data. The memory 1005 also stores the data associated with or generated by the execution of the inventive steps.

FIG. 11 is a diagram of exemplary components of a mobile terminal 1101 (e.g., client terminal 119, vehicle 101, or component thereof) capable of operating in the system of FIG. 1, according to one embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide zone-to-zone trip reliability analysis using probe data. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

determining probe data collected from a plurality of sensors of a plurality of probe vehicles traveling in a geographic area of interest;

processing the probe data to determine a plurality of vehicle trips;

clustering the plurality of vehicle trips into one or more zone-to-zone trip categories based on origin zones and destination zones of the plurality of vehicle trips;

for each zone-to-zone trip category of the one or more zone-to-zone trip categories, computing, using a parallelized compute infrastructure, a zone-to-zone trip category reliability metric based on the plurality of vehicle trips clustered into each zone-to-zone trip category, wherein the parallelized compute infrastructure partitions the plurality of vehicle trips into distinct data partitions corresponding to the distinct zones and applies compute resources to concurrently process the distinct data partitions of the plurality of vehicle trips, and wherein the reliability metric comprises a statistical measure of a variability of zone-to-zone travel times for the plurality of vehicle trips clustered into each zone-to-zone trip category; and providing the zone-to-zone trip category reliability metric for each zone-to-zone trip category as an output.

2. The method of claim 1, further comprising:

processing trip data associated with the plurality of vehicle trips in each zone-to-zone trip category to determine one or more statistical parameters, wherein the zone-to-zone trip category reliability metric is computed based on the one or more statistical parameters.

3. The method of claim 2, wherein the one or more statistical parameters include a mean, median, one or more percentiles, or a combination thereof.

4. The method of claim 2, wherein the trip data includes a zone-to-zone travel time.

5. The method of claim 2, wherein the trip data includes a trips speed distribution, a trips volume for each origin zone and destination zone pair, or a combination thereof.

6. The method of claim 1, further comprising:

map matching the plurality of vehicle trips to map data of a geographic database, wherein the origin zones and the destination zones are determined based on the map matching.

7. The method of claim 1, further comprising:

determining one or more contextual attributes of the plurality of vehicle trips, wherein the zone-to-zone trip category reliability metric is determined with respect to the one or more contextual attributes.

8. The method of claim 7, wherein the one or more contextual attributes include a time epoch, an environmental condition, a vehicle attribute, or a combination thereof.

9. The method of claim 7, wherein the output is provided based on the one or more contextual attributes.

10. The method of claim 1, wherein the origin zones, the destination zones, or a combination thereof are predefined.

11. The method of claim 1, wherein the origin zones, the destination zones, or a combination thereof are dynamically adjusted based on the probe data, the plurality of trips, or a combination thereof.

12. The method of claim 1, further comprising:

automatically controlling an operation of an autonomous vehicle based on the zone-to-zone category reliability metric.

13. The method of claim 1, further comprising:

providing the output as an input to a routing engine to compute an estimated time of arrival based on the zone-to-zone trip category reliability metric.

14. The method of claim 1, wherein the probe data is collected in real-time, and wherein the zone-to-zone trip reliability metric is dynamically updated in real-time.

15. An apparatus comprising:

at least one processor; and at least one memory including computer program code for one or more programs, the at least one memory and the computer program code configured to, with the at least one processor, cause the apparatus to perform at least the following, determine probe data collected from a plurality of sensors of a plurality of probe vehicles traveling in a geographic area of interest;

process the probe data to determine a plurality of vehicle trips;

cluster the plurality of vehicle trips into one or more zone-to-zone trip categories based on origin zones and destination zones of the plurality of vehicle trips;

for each zone-to-zone trip category of the one or more zone-to-zone trip categories, compute, using a parallelized compute infrastructure, a zone-to-zone trip category reliability metric based on the plurality of vehicle trips clustered into each zone-to-zone trip category, wherein the parallelized compute infrastructure partitions the plurality of vehicle trips into distinct data partitions corresponding to the distinct zones and applies compute resources to concurrently process the distinct data partitions of the plurality of vehicle trips, and wherein the reliability metric comprises a statistical measure of a variability of zone-to-zone travel times for the plurality of vehicle trips clustered into each zone-to-zone trip category; and provide the zone-to-zone trip category reliability metric for each zone-to-zone trip category as an output.

16. The apparatus of claim 15, wherein the apparatus is further caused to:

process trip data associated with the plurality of vehicle trips in each zone-to-zone trip category to determine one or more statistical parameters, wherein the zone-to-zone trip category reliability metric is computed based on the one or more statistical parameters.

17. The apparatus of claim 16, wherein the one or more statistical parameters include a mean, median, one or more percentiles, or a combination thereof.

18. A non-transitory computer-readable storage medium carrying one or more sequences of one or more instructions which, when executed by one or more processors, cause an apparatus to perform:

determining probe data collected from a plurality of sensors of a plurality of probe vehicles traveling in a geographic area of interest;

processing the probe data to determine a plurality of vehicle trips;

clustering the plurality of vehicle trips into one or more zone-to-zone trip categories based on origin zones and destination zones of the plurality of vehicle trips;

for each zone-to-zone trip category of the one or more zone-to-zone trip categories, computing, using a parallelized compute infrastructure, a zone-to-zone trip category reliability metric based on the plurality of vehicle trips clustered into each zone-to-zone trip category, wherein the parallelized compute infrastructure partitions the plurality of vehicle trips into distinct data partitions corresponding to the distinct zones and applies compute resources to concurrently process the distinct data partitions of the plurality of vehicle trips, and wherein the reliability metric comprises a statistical measure of a variability of zone-to-zone travel times for the plurality of vehicle trips clustered into each zone-to-zone trip category; and providing the zone-to-zone trip category reliability metric for each zone-to-zone trip category as an output.

19. The non-transitory computer-readable storage medium of claim 18, wherein the apparatus is caused to further perform:

processing trip data associated with the plurality of vehicle trips in each zone-to-zone trip category to determine one or more statistical parameters, wherein the zone-to-zone trip category reliability metric is computed based on the one or more statistical parameters.

20. The non-transitory computer-readable storage medium of claim 19, wherein the one or more statistical parameters include a mean, median, one or more percentiles, or a combination thereof.

* * * * *